United States Patent [19]

Wheeler

[11] Patent Number: 4,724,910

[45] Date of Patent: Feb. 16, 1988

[54] IMPLEMENT WITH RESILIENTLY MOUNTED COULTER GANGS

[75] Inventor: Keith A. Wheeler, Blue Springs, Mo.

[73] Assignee: Deutz-Allis Corporation, Milwaukee, Wis.

[21] Appl. No.: 912,962

[22] Filed: Sep. 29, 1986

[51] Int. Cl.$^4$ .................. A01B 49/02; A01B 61/04; A01B 63/32

[52] U.S. Cl. ............................ 172/464; 172/178; 172/500; 172/572

[58] Field of Search ............ 172/260.5, 491, 572, 172/573, 178, 196, 500, 464, 414, 501, 497, 498, 499, 327, 328, 502

[56] References Cited

U.S. PATENT DOCUMENTS

| | | | |
|---|---|---|---|
| 2,300,192 | 10/1942 | Allen | 172/464 X |
| 3,014,540 | 12/1961 | Youngberg | 172/498 X |
| 3,566,974 | 3/1971 | Kopaska | 172/491 |
| 4,116,140 | 9/1978 | Anderson | 172/501 |
| 4,313,503 | 2/1982 | Good | 172/178 |
| 4,407,372 | 10/1983 | Roseboom | 172/572 |
| 4,546,832 | 10/1985 | Dietrich | 172/260.5 |

Primary Examiner—Richard J. Johnson
Attorney, Agent, or Firm—Charles L. Schwab

[57] ABSTRACT

An agricultural implement is equipped with a plurality of earthworking tools spaced from one another in the fore and aft direction. One of the tools is adjustable between working and nonworking positions on a main frame by a hydraulic actuator connected to the main frame by a resiliently cushioned support which includes a spring loaded link. The one tool includes a coulter gang supported on a subframe by a pair of U-shaped springs. The deflection of the U-shaped springs and the spring loaded link allows the coulter gang to pass over relatively large boulders or the like without raising the implement frame to a significant extent and without causing the relief valve in the actuator hydraulic system to open.

5 Claims, 3 Drawing Figures

IMPLEMENT WITH RESILIENTLY MOUNTED COULTER GANGS

TECHNICAL FIELD

This invention relates to a multiple tool implement having a resiliently mounted coulter gang and more particularly to an implement having a resiliently mounted coulter gang which is adjustable relative to the implement frame by a hydraulic actuator having a resiliently cushioned support on the implement frame.

PRIOR ART STATEMENT

Heretofore, at least one other party has provided a multiple tool agricultural implement which has a spring cushion for a vertically adjustable subframe. One such implement is shown in U.S. Pat. No. 4,546,832 issued Oct. 15, 1985 to William J. Dietrich, Sr. and Cary L. Sizelove for an "Agricultural Implement with Spring Cushion for Vertically Adjustable Subframe". As illustrated and described in the beforementioned patent, some field obstacles can be passed over by the disc gang subframe because of the movement permitted by the spring cushioned anchor for the hydraulic adjusting ram connected to the subframe. However, the spring may not afford enough upward movement of the subframe when a large obstacle is encountered in which case the relief valve for the hydraulic system will open to allow further upward movement of the subframe. Since exhausting fluid from the hydraulic ram takes a substantial amount of time, it is likely the subframe tool will pass over the obstacle before a significant amount of fluid passes through the relief valve. Thus the main implement frame is raised vertically decreasing penetration of the other earthworking tools on the implement. Also, after the large obstacle is passed over, the vertical height of the subframe may have been changed by the exhaust of fluid from the hydraulic ram and passage thereof to the fluid reservoir by way of the relief valve. Heretofore, others have used U-shaped springs for mounting a disc gang to an implement frame. One such mounting arrangement is shown in U.S. Pat. No. 4,407,372 issued Oct. 4, 1983 to Henry Rozeboom on a "Disk Harrow with Cushion Gang".

OBJECTS AND SUMMARY OF THE INVENTION

A primary object of this invention is to provide a cushioned tool gang on a multiple tool implement which is vertically adjusted by a hydraulic actuator resiliently anchored to the implement main frame so as to afford a great amount of resiliently opposed upward movement upon encountering an obstacle in the field being worked.

It is a further object of this invention to provide a support and adjusting arrangement for a resiliently biased earthworking implement tool gang which reacts quickly upon an obstacle being encountered by the tool gang and which allows most field obstacles to be passed over without substantially affecting the working depth of the other tools on the implement.

It is a further object of this invention to provide a spring cushioned anchor for a hydraulic actuator for a tool gang which allows shifting of the anchor point and adjustment of the preload on the cushion spring.

This invention is advantageously used in an agricultural implement having support wheels for adjusting the implement main frame between transport and implement working positions. First and second earthworking tools are operably mounted on the main frame in spaced relation to one another in the direction of movement of the implement during operation. One of the tools is connected to the main frame so as to be movable by power operated means between working and nonworking positions. The power operated means may take the form of an extendable and contractable hydraulic actuator having one of its ends connected to the one tool. The other end of the actuator is connected to the main frame by a resilient cushion support which includes an upstanding lever having its top and bottom ends pivotally connected to the actuator and main frame on upper and lower transverse axes. A spring loaded link is interconnected between the main frame and a point on the lever spaced from the lower axes. The spring loaded link includes a spring which is compressed upon the lever exerting an excess of a predetermined thrust against the link in a direction corresponding to raising movement of the one tool.

The preloaded link may be adjustable to reposition the end of the actuator connected to the lever and adjustment means are provided to change the preload on the spring.

The one tool may include a subframe to which the actuator is connected and the one tool may further include a coulter gang rotatably mounted on the subframe by a pair of U-shaped springs.

BRIEF DESCRIPTION OF THE DRAWINGS

One embodiment of the invention is shown in the drawings, in which:

FIG. 3 is a view taken along the line III—III in FIG. 2.

DETAILED DESCRIPTION OF THE DRAWINGS

Figure 1:
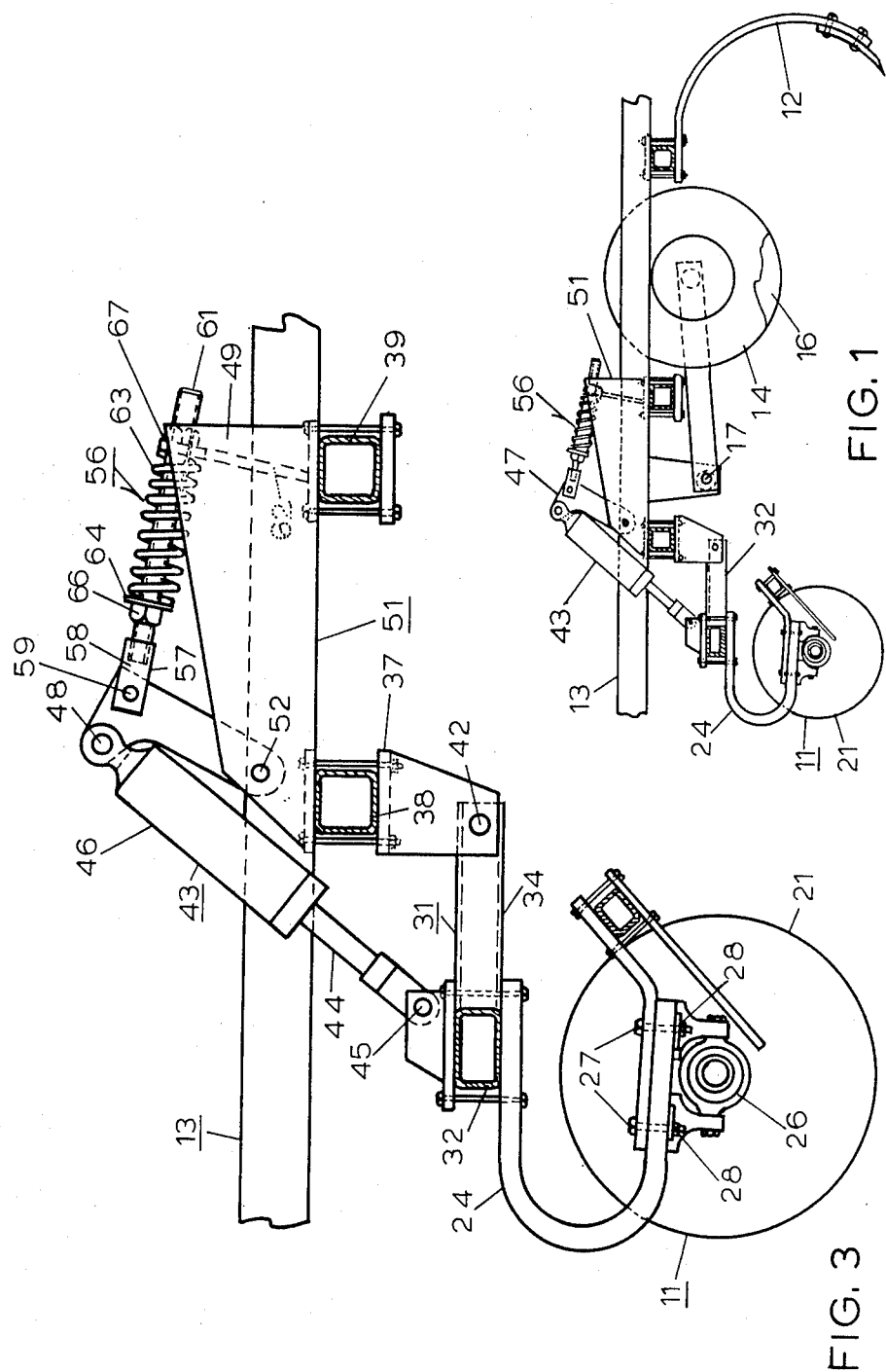
FIG. 1 is a side view of part of an implement carrying two different types of tools.

This invention has particular utility in an implement having two types of tools. FIG. 1 shows the invention in a conservation tillage implement which includes at least one coulter gang 11 and a plurality of spring tooth cultivator shanks 12, one of which is shown, mounted on an implement main frame 13. The implement main frame 13 is selectively raised and lowered between transport and operating positions by laterally spaced wheels 14, 16 rotatably mounted on arms pivotally connected at their forward ends to the implement main frame 13 on a transverse axis 17. The arms are pivoted about the axis 17 by conventional means such as hydraulic actuators, not shown.

Figure 2:
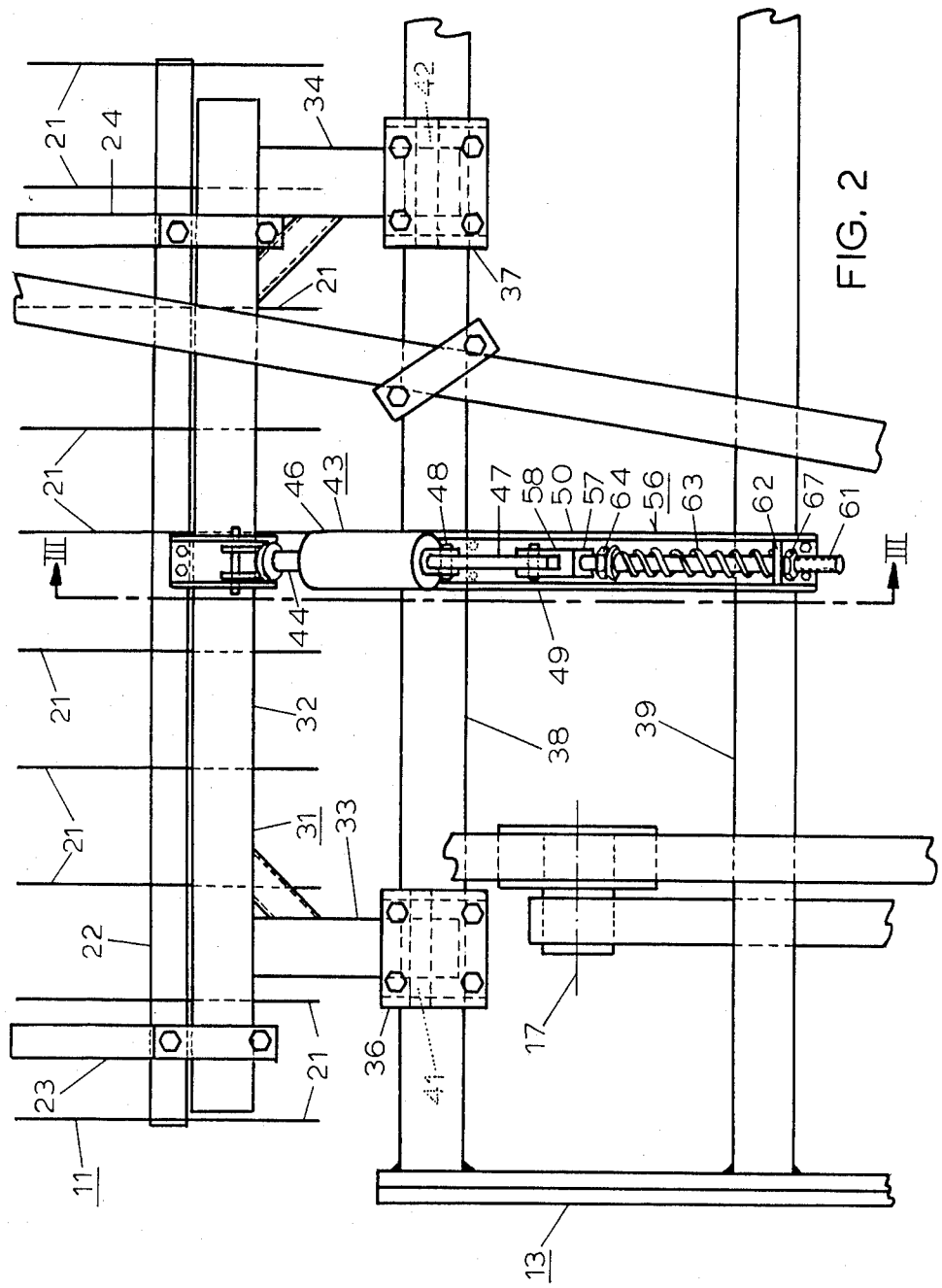
FIG. 2 is a partial top view of the implement shown in FIG. 1.

Referring also to FIGS. 2 and 3, the coulter gang 11 includes a plurality of laterally spaced coulters 21 secured to a transverse shaft 22 which is rotatably mounted on a pair of bearing blocks 26, only one of which is shown. The bearing blocks 26 are secured to the lower legs of a pair of U-shaped springs 23, 24 by bolts 27 and nuts 28. The upper legs of the U-shaped springs 23, 24 are secured by nuts and bolts to a tool subframe 31 which includes a transverse beam 32 with a pair of rearwardly extending arms 33, 34. The rear ends of the arms 33, 34 are pivotally mounted on a pair of brackets 36, 37 bolted to a transverse beam 38 of the implement main frame 13 by a pair of aligned pins 41, 42 for raising and lowering movement of the subframe and coulter gang about the transverse axis of the pins 41, 42. As shown in FIGS. 1 and 3, the coulter gang is in an earthworking position.

The subframe and coulter gang 11 are raised and lowered relative to the implement main frame 13 by power means in the form of a hydraulic ram or actuator 43. The expandable and contractable actuator 43 is a linear actuator having a piston whose rod portion 44 is pivotally connected to the subframe 32 carrying the coulter gang 11 by a transverse pin 45 and a cylinder 46 whose closed end is pivotally connected to the upper end of a lever 47 by a transverse pin 48. The lower end of the lever 47 is pivotally connected to upstanding flanges 49, 50 of a channel shaped support 51 by a transverse pin 52. The support 51 is securely bolted to transverse beams 38, 39 of the implement main frame 13. The lever 47 on which the coulter gang lift ram 43 is mounted is cushioned by resilient cushion means in the form of spring loaded link 56 which includes a rod 57 having a clevis 58 at its front end pivotally connected to an intermediate part of the lever 47 by a transverse pivot pin 59 and a threaded part 61 threadedly engaged in a threaded opening in the base of the clevis 58. The threaded part 61 extends loosely through an unthreaded opening in a transverse vertical abutment plate 62 welded to the inner sides of the flanges 49, 50 and a resilient coil compression spring 63 surrounds the threaded part 61 axially between, and in axial thrust transmitting engagement with, the abutment plate 62 and a thrust washer 64 held against axial movement in the direction away from the spring by a nut 66 in threaded engagement with the threaded part 61. A nut 67 threadedly engaging the threaded part 61 and abutting the rear side of the abutment plate 62 holds the spring 63 and threaded part 61 in assembly with the abutment plate 62 thus maintaining a preload on the spring 63. By turning the nuts 66 and 67 on the threaded part 61, the preload on the compression spring 63 can be adjusted and the unloaded pivot position of the lever 47 on the transverse axis of its pivot pin 52 can also be adjusted.

During a field working operation using both tools 11, 12, the ram 43 will be extended as illustrated in the drawings and the transport wheels 14, 16 will be raised as shown in FIG. 1. If the operator wishes to increase or decrease the depth of penetration of the coulters 21 of the coulter gang 11, the operator causes the ram to be contracted or extended through conventional controls, not shown. If during operation a large boulder should be encountered by one or more of the coulters 21, the U-shaped spring will deflect to permit a predetermined amount of upward movement of the relevant part of the coulter gang 11. The compression spring 63 of the cushioned ram support 56 will also deflect (compress) to a reduced axial length thereby allowing the upper end of the lever and the ram connecting pivot pin 48 to move rearwardly. The combined deflection of the springs 24 and 63 allows a large boulder to be passed over without causing the opening of the relief valve in the hydraulic control system for the hydraulic ram 43. In the event the operator wishes to decrease the preload on the spring 63, the nut 66 is turned to move it toward the clevis 58, and if the operator wishes to increase the preload on the spring 63, the nut 66 is turned to move it away from the clevis 58. If the operator wishes to change the no-load position of the lever 47, the nut 67 is turned. In the event the operator wishes only to use the cultivator tool 12, he will cause the ram 43 to be contracted thereby pivoting the subframe 31 upwardly raising the coulter gang 11 out of contact with the ground.

The embodiments of the inventon in which an exclusive property or privilege is claimed are defined as follows:

1. In an agricultural implement having a predetermined direction of operation and support wheels for adjusting the implement main frame between transport and implement working positions, the combination comprising:
    a first earthworking tool operably mounted on said main frame,
    a second earthworking tool spaced from said first tool in said predetermined direction, said second tool including
        a subframe pivotally connected to said main frame for movement relative thereto on a transverse axis between a raised nonworking position and a lowered working position,
        a coulter gang and
        at least two U-shaped springs operatively interposed between said coulter gang and said subframe,
    power operated means operatively interposed between said second tool and said main frame selectively operable to move said second tool between said working and nonworking positions including an extendable and contractable hydraulic actuator having one of its ends connected to said subframe, and
    a resilient cushion support for the other end of said hydraulic actuator including an upstanding lever having its upper and lower ends pivotally connected to said actuator and said main frame, respectively, on upper and lower transverse axes and a spring loaded link interconnected between said main frame and a point on said lever spaced from said lower axis, said spring loaded link including a resilient spring which is compressed upon said lever exerting in excess of a predetermined thrust against said link in a direction corresponding to raising movement of said second tool.

2. The implement of claim 1 wherein said preloaded link includes means for adjusting the preloaded condition of said link.

3. The implement of claim 2 wherein the effective length of said preloaded link is adjustable.

4. The implement of claim 1 wherein each of said U-shaped springs has an upper leg rigidly secured to said subframe and a lower leg rotatably supporting said coulter gang.

5. In an agricultural implement having a predetermined direction of operation and support wheels for adjusting the implement main frame between transport and implement working positions, the combination comprising:
    a first earthworking tool operably mounted on said main frame,
    a second earthworking tool spaced from said first tool in said predetermined direction, said second tool including
        a subframe pivotally connected to said main frame for movement relative thereto on a transverse axis between a raised nonworking position and a lowered working position,
        a coulter gang and at least two springs operatively interposed between said coulter gang and said subframe, power operated means operatively interposed between said second tool and said main frame selectively operable to move said second tool between said working and nonworking positions including an extendable and contractable hydraulic actuator having one of its ends connected to said subframe, and a resilient cushion support for the other end of said hydraulic actuator including an upstanding lever having its upper and lower ends pivotally connected to said actuator and said main frame, respectively, on upper and lower transverse axes and a spring loaded link interconnected between said main frame and a point on said lever spaced from said lower axis, said spring loaded link including a resilient spring which is compressed upon said lever exerting in excess of a predetermined thrust against said link in a direction corresponding to raising movement of said second tool.

* * * * *